US010964484B2

(12) United States Patent
Ikegaya

(10) Patent No.: US 10,964,484 B2
(45) Date of Patent: Mar. 30, 2021

(54) ON-VEHICLE CIRCUIT UNIT

(71) Applicant: YAZAKI CORPORATION, Tokyo (JP)

(72) Inventor: Koji Ikegaya, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 76 days.

(21) Appl. No.: 15/920,147

(22) Filed: Mar. 13, 2018

(65) Prior Publication Data

US 2018/0308639 A1 Oct. 25, 2018

(30) Foreign Application Priority Data

Apr. 19, 2017 (JP) .............................. JP2017-082996

(51) Int. Cl.
| | | |
|---|---|---|
| *H01G 4/35* | (2006.01) | |
| *B60R 16/02* | (2006.01) | |
| *H01G 4/005* | (2006.01) | |
| *H01B 7/08* | (2006.01) | |
| *H02J 7/00* | (2006.01) | |
| *H01G 4/018* | (2006.01) | |
| *B60R 16/03* | (2006.01) | |
| *H02J 7/34* | (2006.01) | |

(52) U.S. Cl.
CPC ............ *H01G 4/35* (2013.01); *B60R 16/0207* (2013.01); *B60R 16/03* (2013.01); *H01B 7/08* (2013.01); *H01G 4/005* (2013.01); *H01G 4/018* (2013.01); *H02J 7/0063* (2013.01); *H02J 7/345* (2013.01)

(58) Field of Classification Search
CPC .......... H01G 4/35; H01G 4/018; H01G 4/005; B60R 16/03; B60R 16/0207; H02J 7/0063; H02J 7/345; H01B 7/08
See application file for complete search history.

(56) References Cited

U.S. PATENT DOCUMENTS

| | | | |
|---|---|---|---|
| 3,612,744 A | 10/1971 | Thomas | |
| 5,321,411 A * | 6/1994 | Tsukamoto | H01Q 21/064 343/700 MS |
| 5,744,756 A * | 4/1998 | Springer | H01B 7/0838 174/110 F |
| 5,814,555 A * | 9/1998 | Bandyopadhyay | H01L 21/02164 257/E21.279 |
| 6,600,395 B1 * | 7/2003 | Handforth | H01P 3/085 174/117 AS |

(Continued)

FOREIGN PATENT DOCUMENTS

| | | |
|---|---|---|
| DE | 198 51 367 A1 | 5/2000 |
| DE | 10 2013 016 073 A1 | 4/2015 |

(Continued)

OTHER PUBLICATIONS

The extended European search report for the related European Patent Application No. 18163054.2 dated Sep. 18, 2018.

(Continued)

*Primary Examiner* — Pinping Sun
(74) *Attorney, Agent, or Firm* — Kenealy Vaidya LLP

(57) ABSTRACT

An on-vehicle circuit unit includes a first conductor that is a power supply line, a second conductor that is a ground line a dielectric that is disposed between the first conductor and the second conductor.

20 Claims, 6 Drawing Sheets

(56) References Cited

U.S. PATENT DOCUMENTS

| | | | |
|---|---|---|---|
| 7,595,554 B2 * | 9/2009 | Yang | H01L 21/7682 257/750 |
| 8,045,309 B2 * | 10/2011 | Shimada | H02M 5/293 361/91.1 |
| 8,319,113 B2 * | 11/2012 | Cases | H05K 1/024 174/258 |
| 8,492,655 B2 * | 7/2013 | Gundel | H01B 7/0838 174/117 F |
| 8,638,010 B2 * | 1/2014 | Ly | H02J 7/345 307/109 |
| 8,907,211 B2 * | 12/2014 | Fox | H01B 9/028 174/110 R |
| 8,988,909 B2 * | 3/2015 | Murahashi | B60L 3/0046 363/132 |
| 9,159,493 B2 * | 10/2015 | Lynch | H01G 4/206 |
| 9,818,501 B2 * | 11/2017 | Elie | H01B 1/026 |
| 10,257,921 B1 * | 4/2019 | Roy | H05K 1/0245 |
| 2003/0214802 A1 * | 11/2003 | Fjelstad | H05K 1/024 361/826 |
| 2004/0154829 A1 | 8/2004 | Sass | |
| 2005/0042942 A1 | 2/2005 | Sexton et al. | |
| 2005/0168912 A1 * | 8/2005 | Sato | H01G 4/35 361/302 |
| 2006/0207779 A1 * | 9/2006 | Sexton | H01B 7/0216 174/36 |
| 2007/0184706 A1 | 8/2007 | Sexton et al. | |
| 2008/0014731 A1 * | 1/2008 | Yang | H01L 21/7682 438/597 |
| 2008/0047727 A1 | 2/2008 | Sexton et al. | |
| 2008/0047735 A1 | 2/2008 | Sexton et al. | |
| 2008/0196924 A1 | 8/2008 | Beulque | |
| 2008/0304202 A1 * | 12/2008 | Kazama | H01G 4/012 361/303 |
| 2009/0124113 A1 | 5/2009 | Sexton et al. | |
| 2009/0323251 A1 * | 12/2009 | Naskali | H01F 17/02 361/270 |
| 2010/0007441 A1 * | 1/2010 | Yagisawa | H01R 24/44 333/185 |
| 2010/0212934 A1 | 8/2010 | Sexton et al. | |
| 2010/0292859 A1 * | 11/2010 | Terasaki | B60M 3/00 700/295 |
| 2010/0294531 A1 * | 11/2010 | Wefers | H01B 7/0861 174/102 R |
| 2011/0025850 A1 * | 2/2011 | Maekawa | B60R 1/00 348/148 |
| 2012/0012361 A1 | 1/2012 | Sexton et al. | |
| 2013/0003429 A1 | 1/2013 | Murahashi | |
| 2014/0034377 A1 | 2/2014 | Vij | |
| 2014/0116617 A1 * | 5/2014 | Walgenbach | H02G 5/06 156/295 |
| 2015/0200056 A1 * | 7/2015 | Koller | H01G 4/30 323/304 |
| 2015/0255929 A1 * | 9/2015 | Phillips | H01R 13/6587 439/377 |
| 2015/0296298 A1 | 10/2015 | Yamada | |
| 2015/0333452 A1 * | 11/2015 | Smentek | H01F 38/14 439/578 |
| 2016/0197512 A1 * | 7/2016 | Song | H02J 7/025 307/104 |
| 2018/0076502 A1 * | 3/2018 | Chretiennot | G01N 22/00 |
| 2019/0363432 A1 * | 11/2019 | Hayashi | H01Q 1/38 |
| 2020/0295429 A1 * | 9/2020 | Yoshida | H01Q 13/10 |

FOREIGN PATENT DOCUMENTS

| | | |
|---|---|---|
| EP | 0 993 994 A1 | 4/2000 |
| EP | 1 518 774 A1 | 3/2005 |
| JP | 55-62611 A | 5/1980 |
| JP | 62-170104 A | 7/1987 |
| JP | 2002190423 A * | 7/2002 |
| JP | 2003-17335 A | 1/2003 |
| JP | 2004-164944 A | 6/2004 |
| JP | 2004-164945 A | 6/2004 |
| JP | 2005-78962 A | 3/2005 |
| JP | 2006-224772 A | 8/2006 |
| JP | 2007-507061 A | 3/2007 |
| JP | 2010-519686 A | 6/2010 |
| JP | 2011-113939 A | 6/2011 |
| JP | 2011113939 A * | 6/2011 |
| JP | 2012-129631 A | 7/2012 |
| JP | 2015-204530 A | 11/2015 |
| WO | 2011/104848 A1 | 9/2011 |

OTHER PUBLICATIONS

Japanese Office Action for the related Japanese Patent Application No. 2017-082996 dated Feb. 26, 2019.

\* cited by examiner

ON-VEHICLE CIRCUIT UNIT

CROSS REFERENCE TO RELATED APPLICATIONS

This application claims priority from Japanese Patent Application No. 2017-082996 filed on Apr. 19, 2017, the entire contents of which are incorporated herein by reference.

BACKGROUND OF THE INVENTION

Field of the Invention

The present invention relates to an on-vehicle circuit unit

Description of Related Art

Recently, various kinds of on-board network systems have been developed, and thus it has become difficult to maintain a simple wiring harness configuration. A wiring harness that can be used even in a case where device configurations on a network are diverse (see, for example, Patent Literature 1: JP-A-2005-78962) is known.
[Patent Literature 1] JP-A-2005-78962
[Patent Literature 2] JP-A-2012-129631
[Patent Literature 3] JP-A-2015-204530

As a wiring harness configuration of an on-board network system becomes complex, it is difficult to take measures against high-frequency electromagnetic noise (hereinafter, referred to as "noise") generated from noise sources such as various devices or switches mounted on a vehicle. In a wiring harness of a related art, a region where a power supply line formed of electric wire and a ground line formed of electric wire extend in parallel may be present. In this region, it is difficult to provide a dielectric between the power supply line and the ground line.

SUMMARY

One or more embodiments provide an on-vehicle circuit unit in which noise countermeasures can be taken with a simpler structure.

In an aspect (1), one or more embodiments provide an on-vehicle circuit unit including a first conductor that is a power supply line, a second conductor that is a ground line, and a dielectric that is disposed between the first conductor and the second conductor.

In an aspect (2), the dielectric may be disposed between first ends of the first conductor and the second conductor and second ends of the first conductor and the second conductor in a longitudinal direction In an aspect (3), the dielectric may be provided at least one portion between the first ends of the first conductor and the second conductor and the second ends of the first conductor and the second conductor in the longitudinal direction. The first conductor and the second conductor may include a first portion where the dielectric is interposed between the first ends of the first conductor and the second conductor and the second ends of the first conductor and the second conductor in the longitudinal direction and a second portion where the dielectric is not interposed between the first ends of the first conductor and the second conductor and the second ends of the first conductor and the second conductor in the longitudinal direction.

In an aspect (4), the first conductor, the second conductor, and the dielectric may store electric energy for driving a load.

In an aspect (5), the on-vehicle circuit unit may further includes a discharge circuit that is connected to the first conductor and is provided so as to discharge electric energy stored in the first conductor, the second conductor, and the dielectric.

In an aspect (6), the discharge circuit may discharge electric energy stored in the first conductor, the second conductor, and the dielectric in response to reception of a control signal from a device that controls the discharge circuit According to the aspect (1), by forming the capacitor between the power supply line and the ground line, noise propagating through the power supply line can be bypassed by the ground line. That is, the capacitor functions as a bypass capacitor. As a result, noise propagating through the power supply line can be removed. Further, the capacitor can be formed with a simple structure in which the dielectric is interposed between the power supply line and the ground line. Therefore, noise countermeasures can be easily taken with respect to the on-vehicle circuit unit.

According to the aspects (2) and (3), the capacitance of the capacitor formed between the power supply line and the ground line can be easily adjusted.

According to the aspect (4), the capacitor formed between the power supply line and the ground line can be made to function as a capacitor for a backup power supply.

According to the aspects (5) and (6), when the power supply line is disconnected due to a vehicle crash or the like, electric energy stored in the capacitor can be discharged by the discharge circuit. As a result, after a primary accident during a vehicle crush or the like, the occurrence of a secondary accident caused by the discharge of electrical power from the capacitor can be prevented.

According to one or more embodiments, noise countermeasures can be taken with a simpler structure.

Hereinabove, the invention has been briefly described. Further, a mode (hereinafter, referred to as an "embodiment") for carrying out the invention to be described below is read through with reference to the accompanying drawings, thereby further clarifying the details of the invention.

BRIEF DESCRIPTION OF THE DRAWINGS

FIG. 3A is a perspective view illustrating the wiring member. FIG. 3B is a longitudinal sectional view of the wiring member taken along line IIIb-IIIb of FIG. 3A.

FIG. 3C is a cross-sectional view of the wiring member taken along line IIIc-IIIc of FIG. 3A.

The applicant of the invention filed a patent application on Sep. 26, 2016 (Japanese Patent Application No. 2016-187627). An on-vehicle circuit unit according to an embodiment is applicable to an on-vehicle circuit unit described in Japanese Patent Application No. 2016-187627. In order to have a better understanding on the on-vehicle circuit unit according to the embodiment, the summary of the on-vehicle circuit unit described in Japanese Patent Application No. 2016-187627 will be described before specifically describing the on-vehicle circuit unit according to the embodiment.

<Summary of On-Vehicle Circuit Unit Described in Japanese Patent Application No. 2016-187627>

(On-Vehicle Circuit Unit)

First, a basic configuration of the on-vehicle circuit unit will be described.

Figure 1:
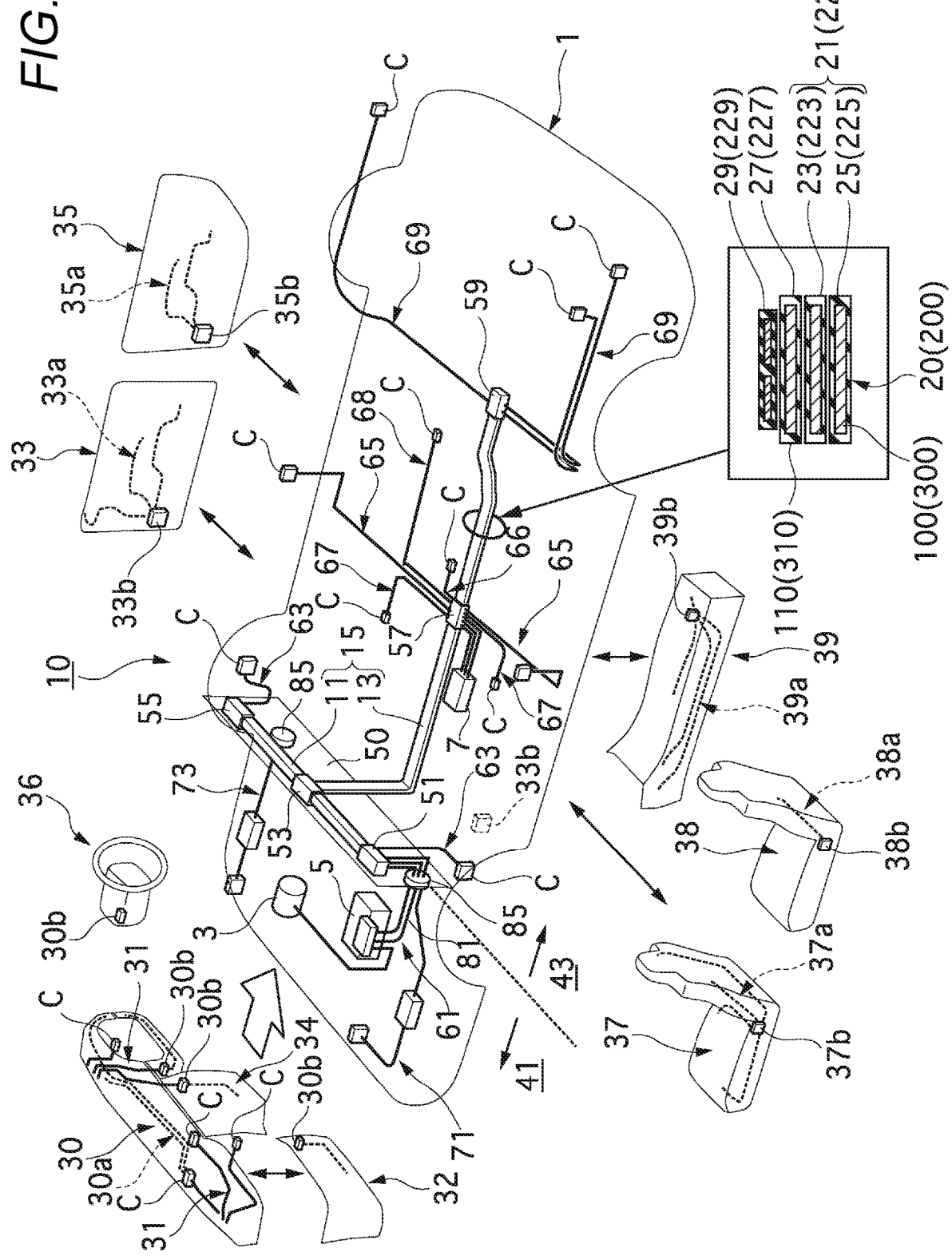
FIG. 1 is an exploded perspective view illustrating the summary of layouts and connection states of respective portions in a state where an on-vehicle circuit unit according to an embodiment is wired on a vehicle body and illustrating the summary of respective modules mounted on the vehicle body.

FIG. 1 illustrates layouts and connection states of respective portions in a state where an on-vehicle circuit unit 10 is wired on a vehicle body.

The on-vehicle circuit unit is used for supplying electrical power from a main power supply such as an on-vehicle battery to auxiliary devices (electrical components) of the respective portions of the vehicle body, or is used as a transmission path required to transfer signals between electrical components (refer to FIG. 1) That is, the on-vehicle circuit unit is functionally the same as a general wiring harness mounted on a vehicle, but a shape or a structure thereof are largely different from those of the general wiring harness.

Specifically, in order to simplify the structure, a trunk line that includes a power supply line having a predetermined current capacity, a communication line having a predetermined communication capacity, and a ground line is configured to include a wiring member 20 having a simple shape such as a backbone. "Predetermined current capacity" refers to a current capacity that is necessary and sufficient, for example, in a case where all the mountable electrical components are mounted on a mounting target vehicle. "Predetermined communication capacity" refers to a communication capacity that is necessary and sufficient, for example, in a case where all the mountable electrical components are mounted on a mounting target vehicle. The on-vehicle circuit unit is configured such that various auxiliary devices (electrical components) can be connected through branch lines connected to plural control boxes that are distributed along the trunk line.

Figure 2:
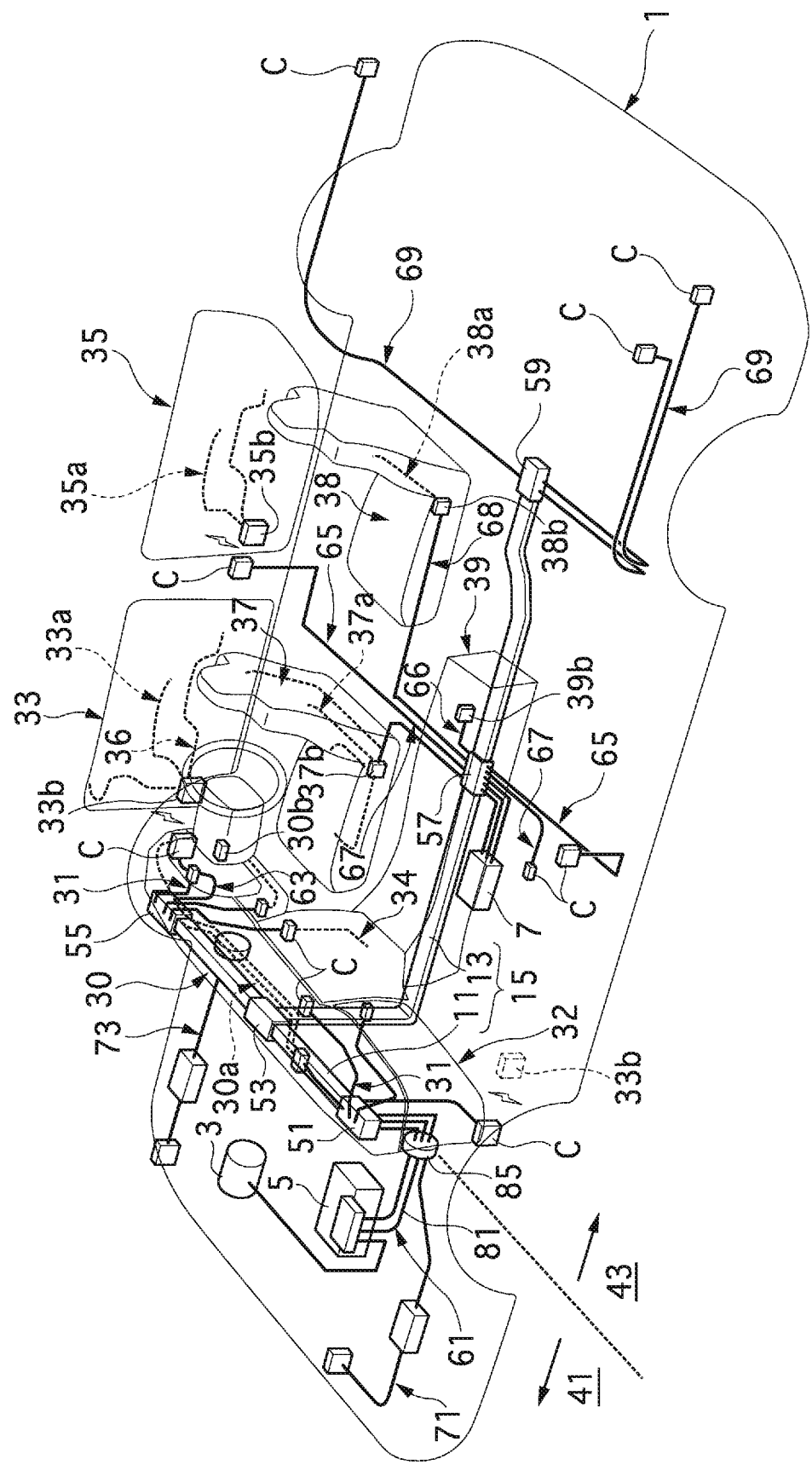
FIG. 2 is a perspective view illustrating a state where the respective modules illustrated in FIG. 1 are mounted on the vehicle body.

The on-vehicle circuit unit 10 illustrated in FIGS. 1 and 2 includes, as basic components, a trunk line, branch lines, and plural control boxes. The trunk line (backbone trunk line portion 15) includes a power supply line 21 and a communication line 29 and is wired on a vehicle body 1. The branch lines (an instrumental panel branch line sub harness 31, a front door branch line sub harness 63, a rear door branch line sub harness 65, a center console branch line sub harness 66, a front seat branch line sub harness 67, a rear seat branch line sub harness 68, and a luggage branch line sub harness 69) are connected to electrical components of respective portions of the vehicle body. The control boxes (a supply-side control box 51, a branch control box 53, a center control box 57, and control boxes 55 and 59) include controllers for distributing electrical power of the power supply line 21 and signals of the communication line 29 supplied from the trunk line to the branch lines connected to the trunk line, and are distributed along the trunk line.

Further, the backbone trunk line portion 15 of the on-vehicle circuit unit 10 is roughly classified into an instrument panel backbone trunk line portion 11 and a floor backbone trunk line portion 13.

In a portion along a surface of the dash panel 50, the instrument panel backbone trunk line portion 11 is disposed at a position above a reinforcement (not illustrated) linearly along a left-right direction so as to be substantially parallel to the reinforcement. The instrument panel backbone trunk line portion 11 may be fixed to the reinforcement.

In addition, the floor backbone trunk line portion 13 is disposed substantially at the center portion of the vehicle body 1 in the left-right direction along the vehicle interior floor so as to extend in a front-rear direction of the vehicle body 1. In a portion along a surface of the dash panel 50, the floor backbone trunk line portion 13 linearly extends in an up-down direction such that a tip end thereof is connected to a center portion of the instrument panel backbone trunk line portion 11. A connection portion between the instrument panel backbone trunk line portion 11 and the floor backbone trunk line portion 13 is in a state where the instrument panel backbone trunk line portion 11 and the floor backbone trunk line portion 13 can be electrically connected to each other through a branch portion of the branch control box 53 described below. That is, in the backbone trunk line portion 15, the instrument panel backbone trunk line portion 11 and the floor backbone trunk line portion 13 form a shape similar to a T-shape.

Further, an engine compartment sub harness 61 is connected to the instrument panel backbone trunk line portion 11 through the supply-side control box 51 disposed on the left side of the vehicle body 1 that is the upstream side of the backbone trunk line portion 15. The engine compartment sub harness 61 includes a main power supply cable 81 through which a main battery 5 as a main power supply and an alternator 3 which are disposed in an engine room (engine compartment) 41 are electrically connected to each other.

Here, the dash panel 50 is provided in a boundary between the engine room 41 and a vehicle interior 43, and it is necessary that a portion where an electrical connection member penetrates the dash panel 50 is completely sealed. That is, in order to secure comfort of the vehicle interior 43, it is necessary that the dash panel 50 has a function of isolating the vehicle interior 43 from vibration from the engine room 41, a function of reducing vibration or noise from a suspension, and a function of blocking high temperature, noise, odor, and the like. In order to prevent deterioration of the functions, it is necessary to sufficiently take care of the portion where the electrical connection member penetrates the dash panel 50.

As described above, in the on-vehicle circuit unit 10, all the major components including the instrument panel backbone trunk line portion 11, the floor backbone trunk line portion 13, the supply-side control box 51, the branch control box 53, the center control box 57, and the control boxes 55 and 59 are disposed in a space on the vehicle interior 43 side. The main power supply cable 81 that is connected to the supply-side control box 51 provided at a left end of the instrument panel backbone trunk line portion 11 is wired so as to pass through a grommet 85 fitted into a through hole of the dash panel 50 and is connected to the engine compartment sub harness 61 in the engine room 41. As a result, electrical power of the main power supply can be supplied to the supply-side control box 51. In addition, the main power supply cable 81 can be formed of an easily foldable material, can be formed in a circular cross-sectional shape, and can be configured such that a cross-sectional area is smaller than the instrument panel backbone trunk line portion 11. Therefore, the sealing using the grommet 85 can be easily performed, and deterioration in workability during wiring can also be avoided.

In addition, in a case where various electrical components in the engine room 41 are connected to the instrument panel backbone trunk line portion 11 in the vehicle interior 43, a desired electrical connection path can be realized, for example, by disposing a sub harness 71 connected to the supply-side control box 51 so as to penetrate the dash panel 50 or by disposing a sub harness 73 connected to the control box 55 so as to penetrate the dash panel 50. In this case, the sub harnesses 71 and 73 have a small cross-sectional area and are easily foldable. Therefore, portions where the sub harnesses 71 and 73 penetrate the dash panel 50 can be easily sealed.

In addition, the instrumental panel branch line sub harness (branch line) 31 and the front door branch line sub harness (branch line) 63 are connected to the instrument panel backbone trunk line portion 11 through the supply-side control box 51 and the control box 55.

The instrumental panel branch line sub harness 31 is electrically connected to a module driver 30b of an instrument panel harness 30a through a module connector C, the instrument panel harness 30a being electrically connected to controllers of electrical components such as a meter panel or an air conditioner mounted on an instrument panel module 30.

It is preferable that the front door branch line sub harness 63 is connected to a module driver 33b of a front door branch line sub harness 33a so as to be capable of non-contact power supply and near field wireless communication, the front door branch line sub harness 33a being electrically connected to controllers of electrical components such as a door lock or a power window mounted on a front door 33.

Further, the rear door branch line sub harness (branch line) 65, the center console branch line sub harness (branch line) 66, the front seat branch line sub harness (branch line) 67, the rear seat branch line sub harness (branch line) 68, and a sub battery 7 are connected to the floor backbone trunk line portion 13 through the center control box 57.

It is preferable that the rear door branch line sub harness 65 is connected to a module driver 35b of a rear door harness 35a so as to be capable of non-contact power supply and near field wireless communication, the rear door harness 35a being electrically connected to controllers of electrical components such as a door lock or a power window mounted on a rear door 35.

The center console branch line sub harness 66 is electrically connected to a module driver 39b of a center console harness 39a through the module connector C, the center console harness 39a being electrically connected to controllers of electrical components such as an air conditioner or an audio control panel mounted on a center console 39.

The front seat branch line sub harness 67 is electrically connected to a module driver 37b of a front seat harness 37a through the module connector C, the front seat harness 37a being electrically connected to controllers of electrical components such as an electric reclining mechanism or a seat heater mounted on a front seat 37.

The rear seat branch line sub harness 68 is electrically connected to a module driver 38b of a rear seat harness 38a through the module connector C, the rear seat harness 38a being electrically connected to controllers of electrical components such as an electric reclining mechanism or a seat heater mounted on a rear seat 38.

Further, the luggage branch line sub harness (branch line) 69 is connected to the floor backbone trunk line portion 13 through the control box 59 disposed on the rear side of the vehicle body 1 that is the downstream side of the trunk line.

The luggage branch line sub harness 69 is electrically connected to a module driver (not illustrated) of a luggage harness through the module connector C, the luggage harness being electrically connected to controllers of various electrical components in a luggage room.

The module connector C can connect can collectively connect electrical power and signals of the power supply and the ground to the control boxes such that electrical power and signals can be effectively transferred to the backbone trunk line portion 15 and respective auxiliary devices.

(Wiring Member)

The backbone trunk line portion 15 of the on-vehicle circuit unit 10 includes the power supply line 21, the communication line 29, and the ground line 27, and forms the wiring member 20 including flat conductors 100.

In addition, in a configuration illustrated in FIG. 1, it is assumed that the sub battery (sub power supply) 7 is present. Therefore, the backbone trunk line portion 15 of the on-vehicle circuit unit 10 includes, as the power supply line 21, a main power supply system (power supply line) 23 and a sub power supply system (power supply line) 25.

In the wiring member 20, the power supply line 21, the ground line 27, and the communication line 29 in the backbone trunk line portion 15 adopts flat conductors 100 that are formed of a belt-shaped metal material (for example, a copper alloy or aluminum) having a flat cross-sectional shape, and the flat conductors 100 covered with an insulating coating 110 are laminated in a thickness direction (refer to FIG. 1). That is, the main power supply system 23 is laminated on the sub power supply system 25 configuring the power supply line 21, and the communication line 29 in which, for example, a pair of flat conductors are provided in parallel is laminated on the ground line 27 laminated on the main power supply system 23.

As a result, the wiring member 20 can allow transmission of a high current and is relatively easily foldable in the thickness direction. In addition, the wiring member 20 can be wired in a state where the power supply line 21 and the ground line 27 adjacent to each other extend in parallel, and the ground line 27 is laminated between the communication line 29 and the power supply line 21. As a result, sneaking of power supply noise can be prevented.

In addition, in order to secure a predetermined current capacity, it is necessary that the power supply line 21 of the backbone trunk line portion 15 has a large cross-sectional area. However, the power supply line 21 is configured to include the wiring member 20 including the belt-shaped flat conductors 100 having a flat cross-sectional shape and thus is easily foldable in the thickness direction and can be easily processed to be wired along a predetermined wiring path.

(Control Box)

The on-vehicle circuit unit 10 includes the five control boxes including: the supply-side control box 51 that is disposed at an upstream end of the backbone trunk line portion 15 (a left end of the instrument panel backbone trunk line portion 11); the branch control box 53 that is disposed at a branch portion in the middle of the backbone trunk line portion 15 (a connection portion between the instrument panel backbone trunk line portion 11 and the floor backbone trunk line portion 13); the center control box 57 that is disposed in the middle of the backbone trunk line portion 15 (a center portion of the floor backbone trunk line portion 13); and the control boxes 55 and 59 that are disposed at downstream ends of the backbone trunk line portion 15 (a right end of the instrument panel backbone trunk line portion 11 and a rear end of the floor backbone trunk line portion 13).

(Module)

In the on-vehicle circuit unit 10, the instrumental panel branch line sub harness 31, the front door branch line sub harness 63, the rear door branch line sub harness 65, the center console branch line sub harness 66, the front seat branch line sub harness 67, the rear seat branch line sub harness 68, and the like connected to the backbone trunk line portion 15 as the branch lines are integrated with the instrument panel module 30, the front door 33, the rear door 35, the center console 39, the front seat 37, the rear seat 38, and the like to form modules, respectively.

That is, the instrumental panel branch line sub harness 31 is connected to the module driver 30b of the instrument panel harness 30a that is electrically connected to the controllers of the electrical components mounted on the instrument panel module 30. As a result, the instrumental panel branch line sub harness 31 can be integrated with the instrument panel module 30 to form a module.

In addition, the front door branch line sub harness 63 is connected to the module driver 33b of the front door branch line sub harness 33a so as to be capable of non-contact power supply and near field wireless communication, the front door branch line sub harness 33a being electrically connected to the controllers of the electrical components mounted on the front door 33. As a result, the front door branch line sub harness 63 can be integrated with the front door 33 to form a module.

In addition, the rear door branch line sub harness 65 is connected to the module driver 35b of the rear door harness 35a so as to be capable of non-contact power supply and near field wireless communication, the rear door harness 35a being electrically connected to the controllers of the electrical components mounted on the rear door 35. As a result, the rear door branch line sub harness 65 can be integrated with the rear door 35 to form a module.

In addition, the center console branch line sub harness 66 is connected to the module driver 39b of the center console harness 39a that is electrically connected to the controllers of the electrical components mounted on the center console 39. As a result, the center console branch line sub harness 66 can be integrated with the center console 39 to form a module.

In addition, the front seat branch line sub harness 67 is electrically connected to the module driver 37b of the front seat harness 37a that is electrically connected to the controllers of the electrical components mounted on the front seat 37. As a result, the front seat branch line sub harness 67 is integrated with the front seat 37 to form a module.

The rear seat branch line sub harness 68 is electrically connected to the module driver 38b of the rear seat harness 38a that is electrically connected to the controllers of the electrical components mounted on the rear seat 38. As a result, the rear seat branch line sub harness 68 is integrated with the rear seat 38 to form a module.

Further, as illustrated in FIG. 1, the instrument panel module 30 includes an instrument panel main body and plural instrument panel sub modules such as a glove compartment 32, a center cluster 34, and a steering wheel 36.

On the left side of the vehicle body 1 of the instrument panel module 30 to which the glove compartment is attached, the supply-side control box 51 that is disposed on the left side of the instrument panel backbone trunk line portion 11 is positioned.

Therefore, in a case where a mechanical relay or a mechanical fuse for power distribution is provided in the supply-side control box 51 that is electrically connected to the main battery 5 through the main power supply cable 81, the glove compartment 32 is removed such that the mechanical relay or the mechanical fuse in the supply-side control box 51 can be easily accessed and the maintenance thereof for replacement is easy.

(Effect of On-Vehicle Circuit Unit)

As described above, the on-vehicle circuit unit 10 can be configured to have a simple structure by the backbone trunk line portion 15 and the branch lines, in which the backbone trunk line portion 15 has a predetermined current capacity and a predetermined communication capacity and is routed in the vehicle body 1, and the branch lines (for example, the instrumental panel branch line sub harness 31, the front door branch line sub harness 63, the rear door branch line sub harness 65, the center console branch line sub harness 66, the front seat branch line sub harness 67, the rear seat branch line sub harness 68, and the luggage branch line sub harness 69) connects the electrical components of the respective portions of the vehicle body to the backbone trunk line portion 15 through the five control boxes (the supply-side control box 51, the branch control box 53, the center control box 57, and the control boxes 55 and 59) that are distributed along the backbone trunk line portion 15.

That is, the backbone trunk line portion 15 having a simple overall shape can be easily manufactured, the backbone trunk line portion 15 including: the instrument panel backbone trunk line portion 11 that extends in the left-right direction of the vehicle body 1; and the floor backbone trunk line portion 13 that extends in the front-rear direction of the vehicle body 1 substantially at the center portion of the vehicle body 1. The backbone trunk line portion 15 may have a structure that can be divided into portions at the respective control boxes and in which the portions can be connected to each other through the control boxes.

Hereinabove, the summary of the on-vehicle circuit unit described in Japanese Patent Application No. 2016-187627 has been described. The noise countermeasures (refer to Patent Document 1 and Patent Document 2) with respect to the wiring harness of the related art described above in "BACKGROUND OF THE INVENTION" is not applicable to the novel on-vehicle circuit unit having a simple structure described above, and it is necessary to take a different approach from that of the related art. Hereinafter, an on-vehicle circuit unit in which noise countermeasures according to the embodiment of the invention are taken will be described in detail.

<On-Vehicle Circuit Unit According to Embodiment of Invention>

(Function as Bypass Capacitor)

Figure 3A:
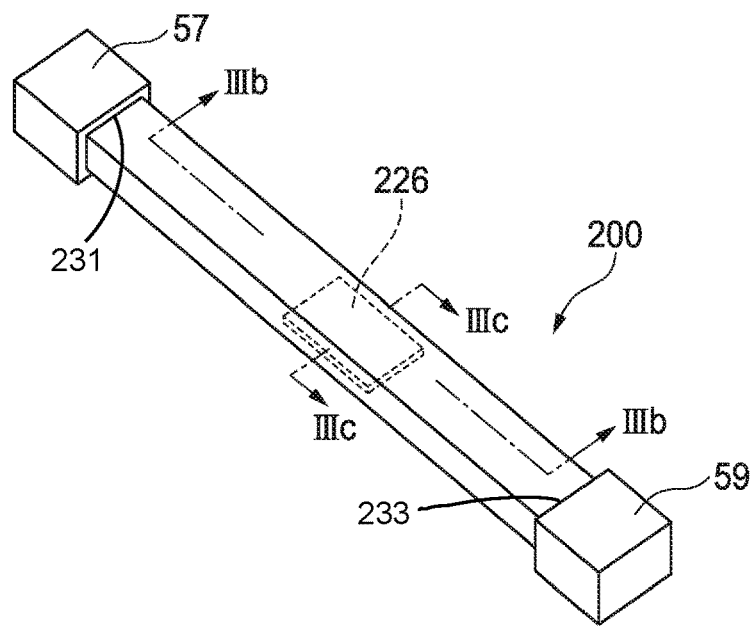
FIGS. 3A to 3C are diagrams illustrating a wiring member in the on-vehicle circuit unit according to the embodiment.
Figure 3B:
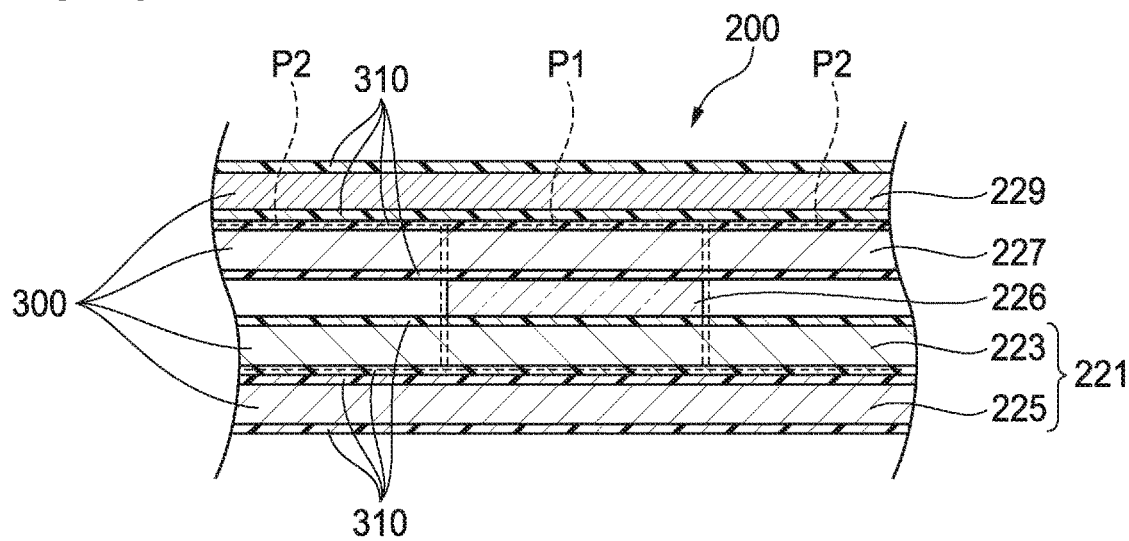
Figure 3C:
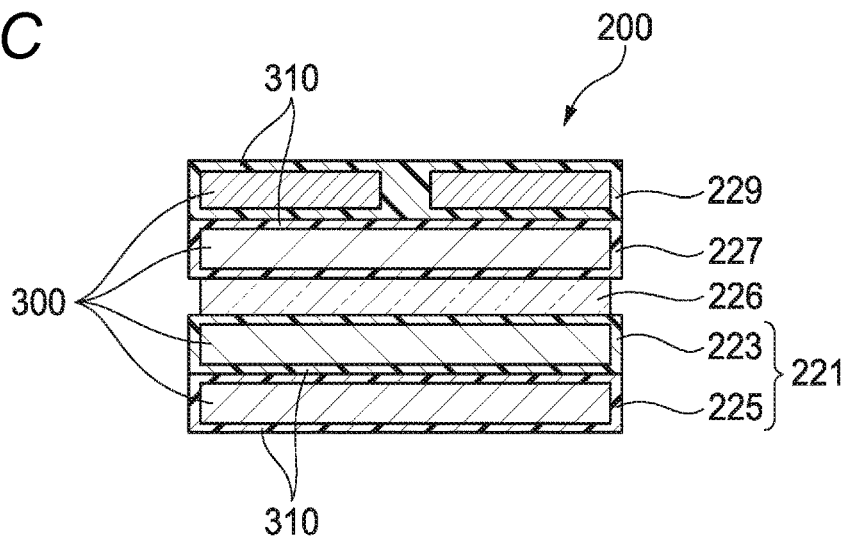

In the on-vehicle circuit unit according to the embodiment of the invention, noise countermeasures are taken with respect to the wiring member 20 in the on-vehicle circuit unit 10 described above with reference to FIGS. 1 and 2. FIGS. 3A to 3C are diagrams illustrating the wiring member in the on-vehicle circuit unit according to the embodiment of the invention. FIG. 3A is a perspective view illustrating the wiring member, FIG. 3B is a longitudinal sectional view of the wiring member taken along line IIIb-IIIb of FIG. 3A, and FIG. 3C is a cross-sectional view of the wiring member taken along line IIIc-IIIc of FIG. 3A. FIGS. 3A to 3C illustrate the wiring member positioned between the center control box 57 and the control box 59 of FIGS. 1 and 2. In order to avoid confusion with the wiring member 20 described in Japanese Patent Application No. 2016-187627, the wiring member and components constituting the wiring member will be represented by different reference numerals in the embodiment of the invention.

A wiring member 200 in the on-vehicle circuit unit 10 according to the embodiment of the invention includes a power supply line 221, a communication line 229, and a ground line 227. In the wiring member 200, each of the power supply line 221, the ground line 227, and the communication line 229 in the backbone trunk line portion 15 includes a flat conductor 300 that is formed of a belt-shaped metal material (for example, a copper alloy or aluminum) having a flat cross-sectional shape. In the power supply line 221, the communication line 229, and the ground line 227, each of the flat conductors 300 is covered with an insulating coating 310. The flat conductors 300 have a first end that corresponds to a first end 231 of the wiring member 200 and a second end that corresponds to a second end 233 of the wiring member 200.

In addition, in the configuration illustrated in FIGS. 3B and 3C, it is assumed that the sub battery (sub power supply) 7 is present as in the configuration illustrated in FIGS. 1 and 2. Therefore, the wiring member 200 includes, as the power supply line 221, a main power supply system (power supply line) 223 and a sub power supply system (power supply line) 225. In the main power supply system 223, the sub power supply system 225, the ground line 227, and the communication line 229, as illustrated in FIG. 3B, each of the flat conductors 300 extends toward the center control box 57 and the control box 59.

Further, as illustrated in FIGS. 3B and 3C, the wiring member 200 includes a dielectric layer 226 that is formed of a belt-shaped dielectric (for example, an aluminum oxide coating) having a flat cross-sectional shape.

The dielectric layer 226 is positioned between the main power supply system 223 and the ground line 227 in the thickness direction of the wiring member 200. In addition, as indicated by a dotted line in FIG. 3A, the dielectric layer 226 is not provided over the entire length between the center control box 57 and the center control box 59 in an extending direction (longitudinal direction) of the wiring member 200 unlike the flat conductor 300, and is positioned at one portion of the flat conductor 300 in the longitudinal direction. Therefore, in the extending direction, the main power supply system 223 and the ground line 227 are divided into a portion P1 where the dielectric layer 226 is interposed therebetween and a portion P2 where the dielectric layer 226 is not interposed therebetween An air layer is formed in the portion P2 where the dielectric layer 226 is not interposed between the main power supply system 223 and the ground line 227.

The main power supply system 223, the sub power supply system 225, the dielectric layer 226, the ground line 227, and the communication line 229 are laminated in the thickness direction (refer to FIGS. 3B and 3C). That is, the main power supply system 223 is laminated on the sub power supply system 225, the dielectric layer 226 is laminated on the main power supply system 223, the ground line 227 is laminated on the dielectric layer 226, and the communication line 229 in which a pair of flat conductors are provided in parallel is laminated on the ground line 227.

Figure 4:
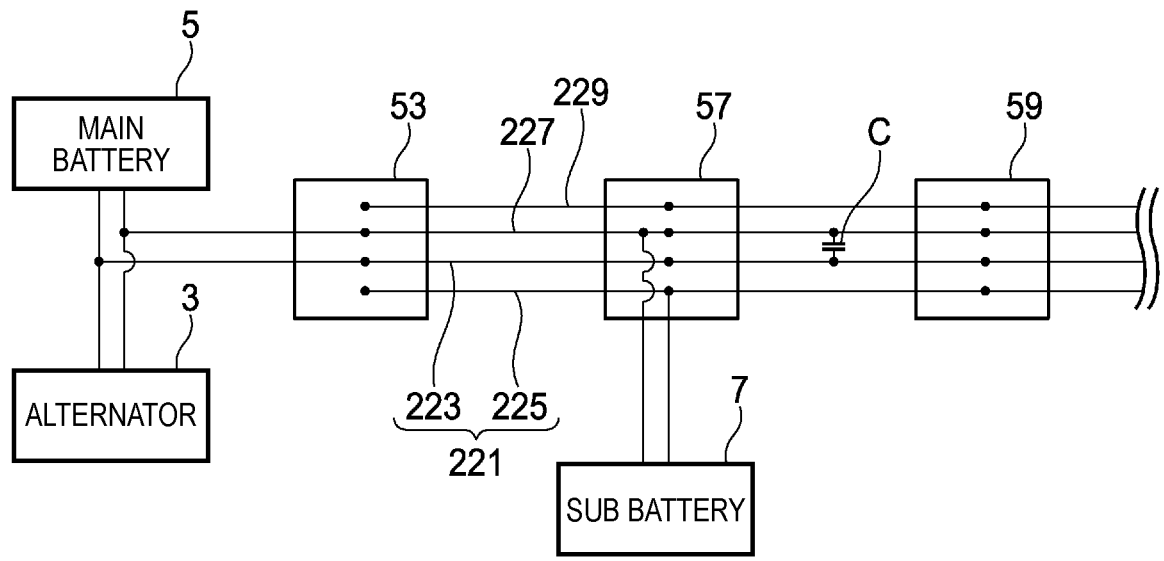
FIG. 4 is a diagram illustrating an equivalent circuit of the wiring member in the on-vehicle circuit unit according to the embodiment.

The wiring member 200 in the on-vehicle circuit unit according to the embodiment of the invention is configured as described above. In the wiring member 200 having the above-described configuration, the portion P1 where the dielectric layer 226 is interposed between the main power supply system 223 and the ground line 227 functions as a capacitor. In a circuit that is formed by the wiring member 200, the portion P1 functions as a capacitor C as in an equivalent circuit of the wiring member in the on-vehicle circuit unit according to the embodiment of the invention illustrated in FIG. 4. That is, the capacitor C formed by the portion P1 functions as an element that has a first end connected to the main power supply system 223 and a second end connected to the ground line 227.

This way, by forming the capacitor C between the main power supply system 223 and the ground line 227, noise propagating through the main power supply system 223 is bypassed by the ground line 227. That is, the capacitor C functions as a bypass capacitor. This way, noise propagating through the main power supply system 223 can be removed by the wiring member 200 in the on-vehicle circuit unit 10 according to the embodiment of the invention. Further, since the on-vehicle circuit unit 10 itself has a simple structure, the capacitor C can be formed with a simple structure in which the dielectric layer 226 is interposed between the main power supply system 223 and the ground line 227. Therefore, noise countermeasures can be easily taken with respect to the on-vehicle circuit unit 10.

Incidentally, in a wiring harness of the related art, a region where a power supply line formed of electric wire and a ground line formed of electric wire extend in parallel may be present. In this region, it is difficult to provide a dielectric between the power supply line and the ground line. The reason for this is that, in a wiring harness that is a bundle of various electric wires having different diameters, it is difficult to specify an appropriate portion between the power supply line and the ground line, and even in a case where the appropriate portion is specified, another electric wire is positioned at the portion. On the other hand, in the on-vehicle circuit unit 10 according to the embodiment of the invention in which the capacitor C can be formed simply by interposing the dielectric layer 226 between the main power supply system 223 and the ground line 227, it can be said that the simple structure of the on-vehicle circuit unit 10 itself is utilized to the maximum.

The capacitance of the capacitor C formed by the portion P1 can be easily adjusted by adjusting the relative dielectric constant of the dielectric layer 226, the thickness of the dielectric layer 226 (the distance between the main power supply system 223 and the ground line 227), and the area of the dielectric layer 226 (the area where the main power supply system 223 and the ground line 227 face each other). By appropriately adjusting the capacitance as described above, noise having a desired frequency component can be removed. In addition, the portion P1 can be provided at multiple positions of the wiring member 200. The capacitance of the capacitor in the entire area of the wiring member 200 can also be adjusted by adjusting the number of positions where the portion P1 is provided.

(Function as Capacitor for Backup Power Supply)

Hereinafter, the description will made focusing that the capacitor C formed between the main power supply system 223 and the ground line 227 functions as a power storage device. In the wiring member 200, as illustrated in FIGS. 1 and 2, a first end of the main power supply system 223 is connected to the main battery 5 through the main power supply cable 81, and a second end of the main power supply system 223 is connected to various electrical components (loads) in the luggage room through the luggage branch line sub harness 69. While electrical power is being supplied from the main battery 5 to the electrical components in the luggage room through the main power supply system 223, the electrical power is stored in the capacitor C formed between the main power supply system 223 and the ground line 227. Next, when the supply of electrical power from the main battery 5 is stopped, the capacitor C discharges electrical power, and the electrical power is supplied to the electrical components through the rear door branch line sub harness 65, the center console branch line sub harness 66, the front seat branch line sub harness 67, the rear seat branch line sub harness 68, and the luggage branch line sub harness 69.

The capacitance of the capacitor C formed between the main power supply system 223 and the ground line 227 can be easily adjusted as described above. This implies that electric energy that is desired to be stored in the capacitor C can be easily adjusted. This way, by causing the capacitor C to store or discharge predetermined electric energy required to drive electrical components, the capacitor C can be made to function as a capacitor for a backup power supply.

Figure 5:
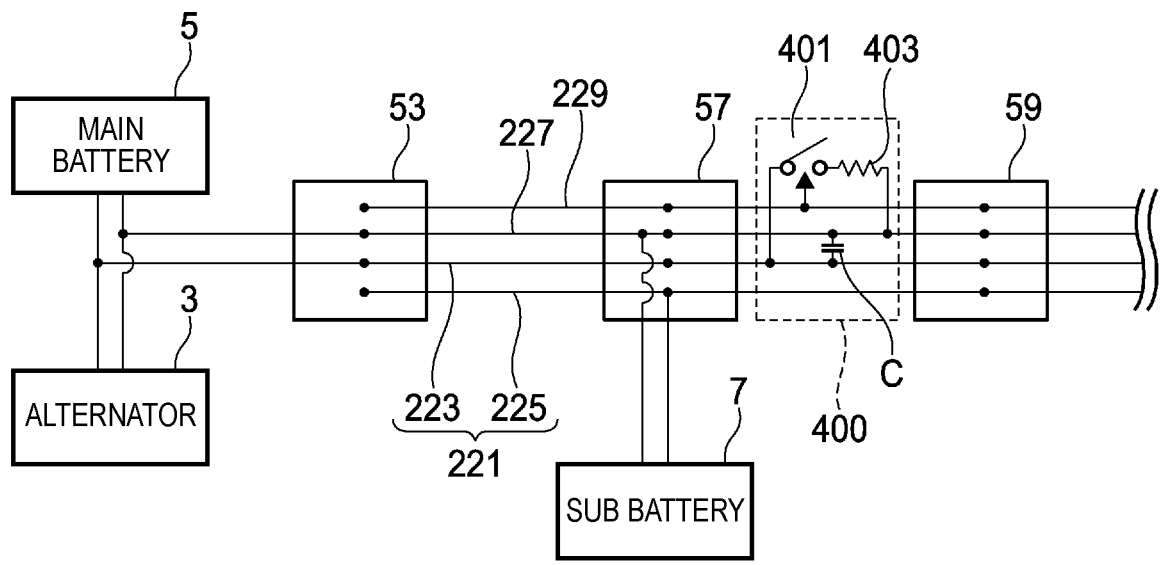
FIG. 5 is a diagram illustrating an equivalent circuit of a discharge circuit in the on-vehicle circuit unit according to the embodiment.

In a case where the capacitor C formed between the main power supply system 223 and the ground line 227 is made to function as a power storage device, when the main power supply system 223 is disconnected due to a vehicle crash or the like, electrical power may be supplied to electrical components. In this case, it is preferable to provide a discharge circuit for discharging electric energy stored in the capacitor C. FIG. 5 is illustrates an equivalent circuit of the discharge circuit in the on-vehicle circuit unit according to the embodiment of the invention. As illustrated in FIG. 5, the discharge circuit 400 is connected to the main power supply system 223 and the ground line 227 so as to be parallel to the capacitor C. In the discharge circuit 400, a switch 401 and a resistance 403 are connected in series. When the supply of electrical power from the main battery 5 to the main power supply system 223 is stopped, and when the switch 401 of the discharge circuit 400 is closed, the electric energy stored in the capacitor C is consumed by the resistance 403.

Figure 6:
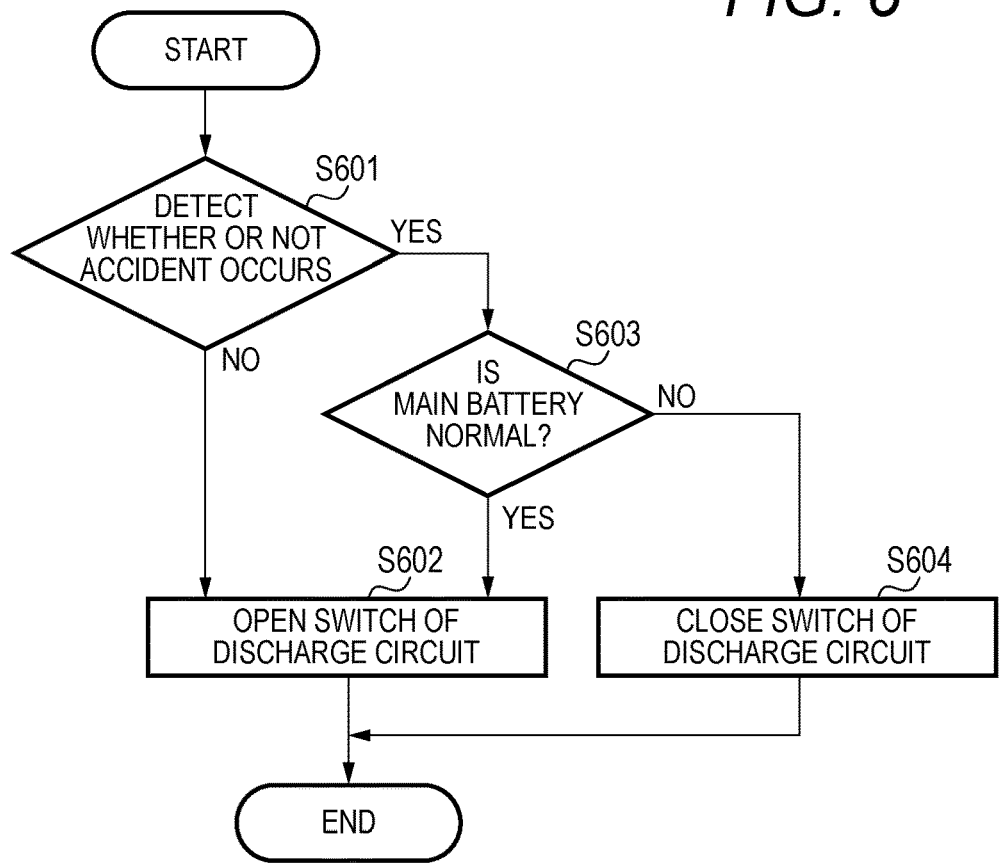
FIG. 6 is a diagram illustrating a determination flow of an ECU in the on-vehicle circuit unit according to the embodiment.

The switch 401 is opened and closed according to a control signal transmitted from each of electronic control units (ECUs) in the control boxes 51, 53, 55, 57, and 59 through the communication line 229. Signals output from various sensors provided in the vehicle are input to the ECUs through the branch line sub harnesses 65, 66, 67, 68, and 69. Based on the input signals, the ECUs determines the opening and closing of the switch 401 and outputs a control signal that commands the opening and closing of the switch 401 to the switch 401. A specific example in which the ECU determines the opening and closing of the switch 401 will be described with reference to FIG. 6. FIG. 6 illustrates a determination flow of an ECU in the on-vehicle circuit unit according to the embodiment of the invention.

The ECU detects whether or not an accident caused by a vehicle crash occurs (S601). In a case where the occurrence of the accident is not detected (S601, NO), the ECU determines to open the switch 401 (S602). On the other hand, in a case where the occurrence of the accident is detected (S601, YES), the ECU determines whether or not the operation of the main battery 5 is normal (S603). In a case where it is determined that the operation of the main battery 5 is normal (S603, YES), the ECU determines to open the switch 401 (S602). On the other hand, in a case where it is determined that the operation of the main battery 5 is not normal (S603, NO), the ECU determines to close the switch 401 (S604). This way, the ECU determines the opening and closing of the switch 401.

Hereinabove, the on-vehicle circuit unit according to the embodiment of the invention has been described in detail. With the wiring member 200 in the on-vehicle circuit unit 10 according to the embodiment of the invention, noise propagating through the main power supply system 223 can be removed. Further, since the on-vehicle circuit unit 10 itself has a simple structure, the capacitor C can be formed with a simple structure in which the dielectric layer 226 is interposed between the main power supply system 223 and the ground line 227. Therefore, noise countermeasures can be easily taken with respect to the on-vehicle circuit unit 10.

In addition, with the wiring member 200 in the on-vehicle circuit unit 10 according to the embodiment of the invention, by causing the capacitor C, which is formed between the main power supply system 223 and the ground line 227, to store or discharge predetermined electric energy required to drive electrical components, the capacitor C can be made to function as a capacitor for a backup power supply. The capacitance of the capacitor C can be easily adjusted due to its structure. Therefore, electric energy stored in the capacitor can be easily adjusted.

In addition, with the wiring member 200 in the on-vehicle circuit unit 10 according to the embodiment of the invention, when the main power supply system 223 is disconnected due to a vehicle crash or the like, electric energy stored in the capacitor C can be discharged by the discharge circuit 400. Therefore, after a primary accident during a vehicle crush or the like, the occurrence of a secondary accident caused by the discharge of electrical power from the capacitor C can be prevented.

In the wiring member 200 of the on-vehicle circuit unit 10 according to the embodiment of the invention, the configuration of forming the capacitor C using the main power supply system 223 and the ground line 227 has been described in detail. A capacitor can also be formed using the sub power supply system 225 and the ground line 227. In order to obtain this configuration, the sub power supply system 225, the dielectric layer 226, and the ground line 227 are laminated in this order in the thickness direction of the wiring member 200. Further, capacitors can also be formed between the main power supply system 223 and the ground line 227 and between the sub power supply system 225 and the ground line 227, respectively. In order to obtain this configuration, two dielectric layers may be used such that the main power supply system, the dielectric, the ground line, the dielectric, and the sub power supply system are laminated in this order in the thickness direction of the wiring member. This way, the lamination order of the power supply line, the ground line, the dielectric can also be appropriately changed such that a capacitor is formed between the power supply line and the ground line.

In <On-Vehicle Circuit Unit according to Embodiment of Invention> described above, in the wiring member 200, the configuration in which the conductors constituting the main power supply system 223, the sub power supply system 225, and the ground line 227 are the flat conductors 300 has been described. In the on-vehicle circuit unit according to the invention, the conductors constituting the power supply line and the ground line are not limited to flat conductors. In an on-vehicle circuit unit according to Modification Example 1 of the invention, a modification example of the wiring member will be described in detail.

<On-Vehicle Circuit Unit According to Modification Example 1 of Invention>

Figure 7:
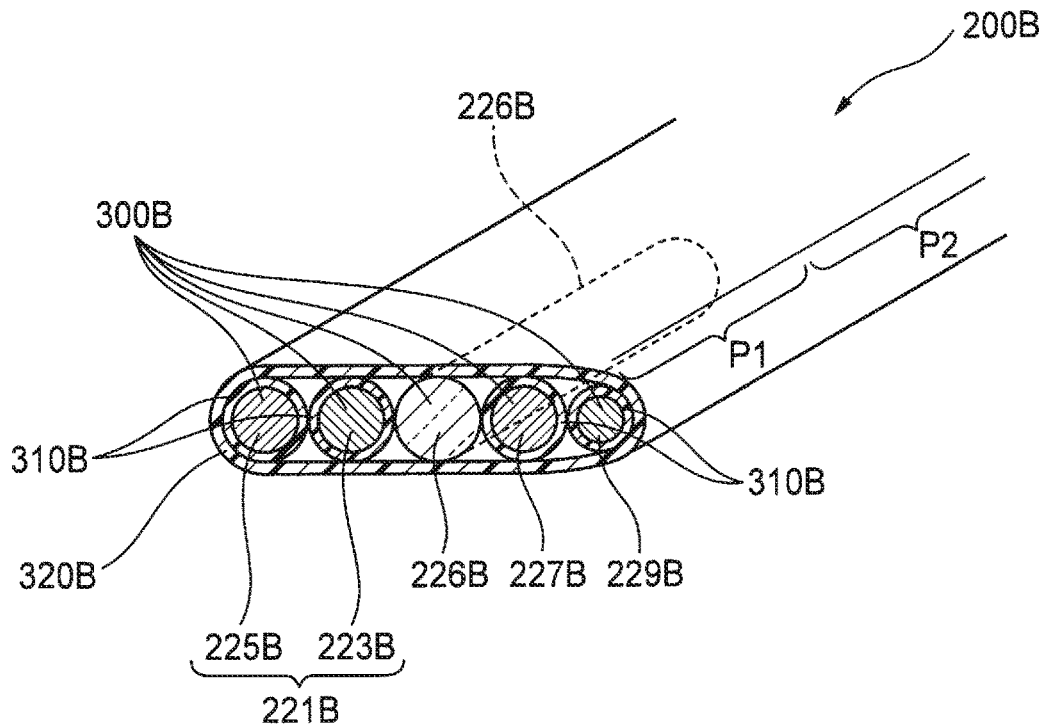
FIG. 7 is a diagram illustrating a wiring member in an on-vehicle circuit unit according to Modification Example 1 of the invention.

FIG. 7 is a diagram illustrating the wiring member in the on-vehicle circuit unit according to Modification Example 1 of the invention. As illustrated in FIG. 7, a wiring member 200B in the on-vehicle circuit unit 10 according to the Modification Example 1 of the invention includes a power supply line 221B, a communication line 229B, and a ground line 227B. In the wiring member 200B, each of the power supply line 221B, the ground line 227B, and the communication line 229B in the backbone trunk line portion 15 includes a cylindrical rod conductor 300B that is formed of a metal material (for example, a copper alloy or aluminum) having a circular cross-sectional shape. In the power supply line 221B, the communication line 229B, and the ground line 227B, each of the cylindrical rod conductors 300B is covered with an insulating coating 310B. The power supply line 221B, the communication line 229B, and the ground line 227B are further covered with an insulating coating 320B.

In addition, as illustrated in FIG. 7, the wiring member 200B includes, as the power supply line 221B, a main power supply system (power supply line) 223B and a sub power supply system (power supply line) 225B.

Further, as illustrated in FIG. 7, the wiring member 200B includes a dielectric layer 226B that is formed of a dielectric (for example, an aluminum oxide coating) having a circular cross-sectional shape.

The dielectric layer 226B is positioned between the main power supply system 223B and the ground line 227B in a width direction of the wiring member 200B in which the respective lines are provided in parallel. In addition, as indicated by a dotted line in FIG. 7, the dielectric layer 226B is not provided over the entire length in the longitudinal direction of the wiring member 200B unlike the cylindrical rod conductor 300B, and is positioned at one portion of the flat conductor 300B in the longitudinal direction. Therefore, in the extending direction, the main power supply system 223B and the ground line 227B are divided into a portion P1 where the dielectric layer 226B is interposed therebetween and portions P2 where the dielectric layer 226B is not interposed therebetween. An air layer is formed in the portion P2 where the dielectric layer 226B is not interposed between the main power supply system 223B and the ground line 227B.

The main power supply system 223B, the sub power supply system 225B, the dielectric layer 226B, the ground line 227B, and the communication line 229B are disposed in parallel in the width direction (refer to FIG. 7). That is, the main power supply system 223B is disposed on the right side of sub power supply system 225B, the dielectric layer 226B is disposed on the right side of the main power supply system 223B, the ground line 227B is disposed on the right side of the dielectric layer 226B, and the communication line 229B is disposed on the right side of the ground line 227B.

The wiring member 200B in the on-vehicle circuit unit 10 according to Modification Example 1 of the invention is configured as described above. In the wiring member 200B having the above-described configuration, the portion P1 where the dielectric layer 226B is interposed between the main power supply system 223B and the ground line 227B functions as a capacitor.

This way, by forming the capacitor C between the main power supply system 223B and the ground line 227B, noise propagating through the main power supply system 223B is bypassed by the ground line 227B. That is, the capacitor C functions as a bypass capacitor. This way, noise propagating through the main power supply system 223B can be removed by the wiring member 200B in the on-vehicle circuit unit 10 according to Modification Example 1 of the invention. Further, since the on-vehicle circuit unit 10 itself has a simple structure, the capacitor C can be formed with a simple structure in which the dielectric layer 226B is interposed between the main power supply system 223B and the ground line 227B. Therefore, noise countermeasures can be easily taken with respect to the on-vehicle circuit unit 10.

In the wiring member 200B of the on-vehicle circuit unit 10 according to Modification Example 1 of the invention, the configuration of forming the capacitor C using the main power supply system 223B and the ground line 227B has been described in detail. A capacitor can also be formed using the sub power supply system 225B and the ground line 227B. In order to obtain this configuration, the sub power supply system 225B, the dielectric layer 226B, and the ground line 227B are disposed in parallel in this order in the width direction of the wiring member 200B. Further, capacitors can also be formed between the main power supply system 223B and the ground line 227B and between the sub power supply system 225B and the ground line 227B, respectively. In order to obtain this configuration, two dielectric layers such that the main power supply system, the dielectric, the ground line, the dielectric, and the sub power supply system are disposed in parallel in this order in the width direction of the wiring member. This way, the parallel disposition order of the power supply line, the ground line, the dielectric can also be appropriately changed such that a capacitor is formed between the power supply line and the ground line.

<On-Vehicle Circuit Unit According to Modification Example 2 of Invention>

Figure 8:
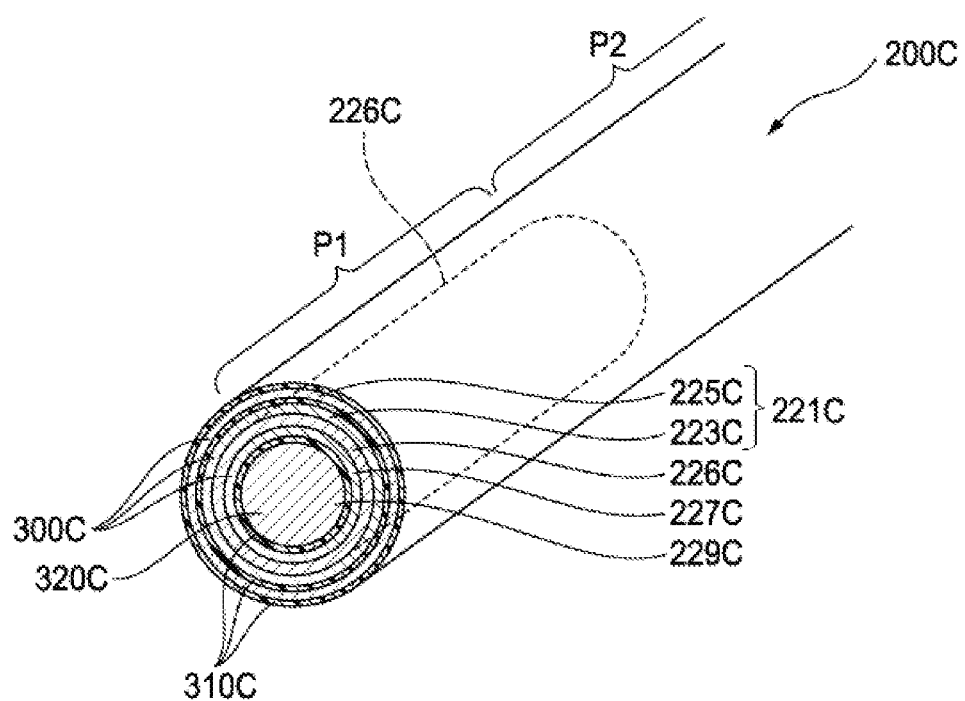
FIG. 8 is a diagram illustrating a wiring member in an on-vehicle circuit unit according to Modification Example 2 of the invention.

FIG. 8 is a diagram illustrating a wiring member in the on-vehicle circuit unit according to Modification Example 2 of the invention. As illustrated in FIG. 8, a wiring member 200C in the on-vehicle circuit unit 10 according to the Modification Example 2 of the invention includes a power supply line 221C, a communication line 229C, and a ground line 227C. In the wiring member 200C, the communication line 229C in the backbone trunk line portion 15 includes a cylindrical rod conductor 320C that is formed of a metal material (for example, a copper alloy or aluminum) having a circular cross-sectional shape. In addition, in the wiring member 200C, each of the power supply line 221C and the ground line 227C in the backbone trunk line portion 15 includes a cylindrical conductor 300C that is formed of a metal material (for example, a copper alloy or aluminum) having a hollow circular cross-sectional shape. The power supply line 221C, the ground line 227C, and the communication line 229C are provided such that central axes match with each other, and diameters thereof increase in order of the communication line 229C, the ground line 227C, and the power supply line 221C. In this case, one having a small diameter is disposed closer to the center, and one having a large diameter is disposed close to the outside.

In addition, as illustrated in FIG. 8, the wiring member 200C includes, as the power supply line 221C, a main power supply system (power supply line) 223C and a sub power supply system (power supply line) 225C. The diameters of the main power supply system 223C and the sub power supply system 225C increase in order of the main power supply system 223C and the sub power supply system 225C. In this case the main power supply system 223C is disposed closer to the center, and the sub power supply system 225C is disposed closer to the outside.

Hollow circular insulating coating 310C are disposed between the communication line 229C and the ground line 227C and between the main power supply system 223C and the sub power supply system 225C, respectively, and the sub power supply system 225C is covered with the insulating coating 310C.

Further, as illustrated in FIG. 8, the wiring member 200C includes a dielectric layer 226C that is formed of a dielectric (for example, an aluminum oxide coating) having a hollow circular cross-sectional shape.

The dielectric layer 226C is positioned between the main power supply system 223C and the ground line 227C. In addition, as indicated by a dotted line in FIG. 8, the dielectric layer 226C is not provided over the entire length in the longitudinal direction of the wiring member 200C unlike the cylindrical conductor 300C, and is positioned at one portion of the flat conductor 300C in the longitudinal direction. Therefore, in the extending direction, the main power supply system 223C and the ground line 227C are divided into a portion P1 where the dielectric layer 226C is interposed therebetween and portions P2 where the dielectric layer 226C is not interposed therebetween. An air layer is formed in the portion P2 where the dielectric layer 226C is not interposed between the main power supply system 223C and the ground line 227C.

The main power supply system 223C, the sub power supply system 225C, the dielectric layer 226C, the ground line 227C, and the communication line 229C are provided such that the central axes thereof match with each other (refer to FIG. 8). That is, the ground line 227C is disposed outside of the communication line 229C, the dielectric layer 226C is disposed outside of the ground line 227C, the main power supply system 223C is disposed outside of the dielectric layer 226C, and the sub power supply system 225C is disposed outside of the main power supply system 223C.

The wiring member 200C in the on-vehicle circuit unit 10 according to Modification Example 2 of the invention is configured as described above. In the wiring member 200C having the above-described configuration, the portion P1 where the dielectric layer 226C is interposed between the main power supply system 223C and the ground line 227C functions as a capacitor.

This way, by forming the capacitor C between the main power supply system 223C and the ground line 227C, noise propagating through the main power supply system 223C is bypassed by the ground line 227C. That is, the capacitor C functions as a bypass capacitor. This way, noise propagating through the main power supply system 223C can be removed by the wiring member 200C in the on-vehicle circuit unit 10 according to Modification Example 2 of the invention. Further, since the on-vehicle circuit unit 10 itself has a simple structure, the capacitor C can be formed with a simple structure in which the dielectric layer 226C is interposed between the main power supply system 223C and the ground line 227C. Therefore, noise countermeasures can be easily taken with respect to the on-vehicle circuit unit 10.

In the wiring member 200C of the on-vehicle circuit unit 10 according to Modification Example 2 of the invention, the configuration of forming the capacitor C using the main power supply system 223C and the ground line 227C has been described in detail. A capacitor can also be formed using the sub power supply system 225C and the ground line 227C. In order to obtain this configuration, the sub power supply system 225C, the dielectric layer 226C, and the ground line 227C are disposed in parallel in this order in a radial direction of the wiring member 200C. Further, capacitors can also be formed between the main power supply system 223C and the ground line 227C and between the sub power supply system 225C and the ground line 227C, respectively. In order to obtain this configuration, two dielectric layers are used such that the main power supply system, the dielectric, the ground line, the dielectric, and the sub power supply system are disposed in parallel in this order in the radial direction of the wiring member. This way, the parallel disposition order of the power supply line, the ground line, the dielectric can also be appropriately changed such that a capacitor is formed between the power supply line and the ground line.

Here, the characteristics of the embodiment of the on-vehicle circuit unit according to the invention will be collectively and briefly described in the following [1] to [6].

[1] An on-vehicle circuit unit (10) comprising:
a first conductor (flat conductor 300, cylindrical rod conductor 300B, cylindrical conductor 300C) that is a power supply line (221, 221B, 221C);
a second conductor (flat conductor 300, cylindrical rod conductor 300B, cylindrical conductor 300C) that is a ground line (227, 227B, 227C); and a dielectric (dielectric layer 226, dielectric layer 226B, dielectric layer 226C) that is disposed between the first conductor and the second conductor.

[2] The on-vehicle circuit unit (10) according to [1],
wherein the dielectric (dielectric layer 226, dielectric layer 226B, dielectric layer 226C) is disposed between first ends of the first conductor and the second conductor and second ends of the first conductor and the second conductor in a longitudinal direction.

[3] The on-vehicle circuit unit according to [2],
wherein the dielectric (dielectric layer 226, dielectric layer 226B, dielectric layer 226C) is provided at least one portion (P1) between the first ends of the first conductor and the second conductor and the second ends of the first conductor and the second conductor in the longitudinal direction, and
wherein the first conductor and the second conductor includes a first portion (P1) where the dielectric is interposed between the first ends of the first conductor and the second conductor and the second ends of the first conductor and the second conductor in the longitudinal direction and a second portion (P2) where the dielectric is not interposed between the first ends of the first conductor and the second conductor and the second ends of the first conductor and the second conductor in the longitudinal direction.

[4] The on-vehicle circuit unit according to [2] or [3],
wherein the first conductor, the second conductor, and the dielectric (capacitor C) store electric energy for driving a load.

[5] The on-vehicle circuit unit according to any one of [1] to [4], further comprising
a discharge circuit (400) that is connected to the first conductor and is provided so as to discharge electric energy stored in the first conductor, the second conductor, and the dielectric.

[6] The on-vehicle circuit unit according to [5],
wherein the discharge circuit (400) discharges electric energy stored in the first conductor, the second conductor, and the dielectric in response to reception of a control signal from a device that controls the discharge circuit.

What is claimed is:
1. An on-vehicle circuit unit comprising: a first conductor that is a power supply line;
a second conductor that is a ground line; and a dielectric formed as a flat plate that is disposed between the first conductor and the second conductor, wherein the first conductor and the second conductor include a first portion and a second portion, the dielectric is disposed at the first portion, and an air layer is formed in the second portion between the first conductor and the second conductor on opposing peripheral sides of the dielectric, wherein the first and second conductors include a first end and a second end, the first portion is spaced away from the first end of each of the first and second conductors in a longitudinal direction, the second portion extends in the longitudinal direction from the first portion to the first end of each of the first and second conductors, and wherein the first portion is spaced away from the second end of each of the first and second conductors in the longitudinal direction, a third portion extends in the longitudinal direction from the first portion to the second end of each of the first and second conductors, and a second air layer is formed in the third portion.

2. The on-vehicle circuit unit according to claim 1, wherein the dielectric is disposed between the first ends of the first conductor and the second conductor and the second ends of the first conductor and the second conductor in the longitudinal direction.

3. The on-vehicle circuit unit according to claim 2, wherein the first conductor, the second conductor, and the dielectric store electric energy for driving a load.

4. The on-vehicle circuit unit according to claim 1, further comprising:
a discharge circuit that is connected to the first conductor and is provided so as to discharge electric energy stored in the first conductor, the second conductor, and the dielectric.

5. The on-vehicle circuit unit according to claim 4, wherein the discharge circuit discharges the electric energy stored in the first conductor, the second conductor, and the dielectric in response to reception of a control signal from a device that controls the discharge circuit.

6. The on-vehicle circuit unit according to claim 1, wherein the dielectric has a flat cross-sectional shape.

7. The on-vehicle circuit unit according to claim 1, wherein opposing faces of the dielectric abut the first conductor and the second conductor in a thickness direction.

8. The on-vehicle circuit unit according to claim 1, wherein the air layer has a uniform thickness.

9. The on-vehicle circuit unit according to claim 8, wherein the thickness of the air layer is substantially the same as a thickness of the dielectric.

10. The on-vehicle circuit unit according to claim 1, wherein the dielectric has a flat cross-sectional shape, wherein opposing faces of the dielectric abut the first conductor and the second conductor in a thickness direction, wherein the opposing peripheral sides of the dielectric face the air layer in the longitudinal direction, and wherein the air layer has a uniform thickness that is substantially the same as a thickness of the dielectric.

11. An on-vehicle circuit unit comprising:
a first conductor that is a power supply line;
a second conductor that is a ground line; and
a dielectric that is disposed between the first conductor and the second conductor, wherein the first conductor and the second conductor include a first portion and a second portion, the dielectric is disposed at the first portion, and an air layer is formed in the second portion, wherein the first and second conductors include a first end and a second end, the first portion is spaced away from the first end of each of the first and second conductors in a longitudinal direction, the second portion extends in the longitudinal direction from the first portion to the first end of each of the first and second conductors, and wherein the first portion is spaced away from the second end of each of the first and second conductors in the longitudinal direction, a third portion extends in the longitudinal direction from the first portion to the second end of each of the first and second conductors, and a second air layer is formed in the third portion.

12. The on-vehicle circuit unit according to claim 1, further comprising:
a first insulating coating covering the first conductor;
a second insulating coating covering the second conductor; and
a third insulator coating covering each of the first conductor, the second conductor, and the dielectric.

13. An on-vehicle circuit unit comprising:
a power supply line that includes a first conductor and a first insulator coating that covers the first conductor;
a ground line that includes a second conductor and a second insulator coating that covers the second conductor; and
a dielectric formed as a flat plate that is disposed between the first insulator and the second insulator, and the dielectric is separate from the first insulator and the second insulator, wherein an air layer is formed between the first insulator and the second insulator on opposing peripheral sides of the dielectric, wherein the first conductor and the second conductor include a first portion and a second portion, the dielectric is disposed at the first portion, wherein the first and second conductors include a first end and a second end, the first portion is spaced away from the first end of each of the first and second conductors in a longitudinal direction, the second portion extends in the longitudinal direction from the first portion to the first end of each of the first and second conductors, and wherein the first portion is spaced away from the second end of each of the first and second conductors in the longitudinal direction, a third portion extends in the longitudinal direction from the first portion to the second end of each of the first and second conductors, and a second air layer is formed in the third portion.

14. The on-vehicle circuit unit according to claim 13, wherein the dielectric is an aluminum oxide coating.

15. The on-vehicle circuit unit according to claim 13, wherein the power line and the ground line include the first portion and the second portion that extends from the first portion, wherein the dielectric is interposed between the power line and the ground line along the first portion and terminates at the second portion.

16. The on-vehicle circuit unit according to claim 13, wherein the power line and the ground line are spaced apart from each other along the second portion by the air layer.

17. The on-vehicle circuit unit according to claim 13, wherein opposing faces of the dielectric abut the first insulator and the second insulator in a thickness direction.

18. The on-vehicle circuit unit according to claim 13, wherein the opposing peripheral sides of the dielectric face the air layer in the longitudinal direction.

19. The on-vehicle circuit unit according to claim 13, wherein the air layer has a uniform thickness.

20. The on-vehicle circuit unit according to claim 19, wherein the thickness of the air layer is substantially the same as a thickness of the dielectric.

* * * * *